United States Patent [19]

Fisher et al.

[11] 4,201,048
[45] May 6, 1980

[54] EXHAUST SYSTEM CONNECTOR

[76] Inventors: Roy G. Fisher, 3965 Newport St., Denver, Colo. 80207; Michael S. Fisher, 6521 S. Logan, Littleton, Colo. 80121

[21] Appl. No.: 841,615

[22] Filed: Oct. 13, 1977

[51] Int. Cl.² ................ F01N 7/00; F16L 27/12
[52] U.S. Cl. ................... 60/322; 285/165; 285/166; 285/302; 285/331
[58] Field of Search ........... 60/313, 322; 244/54; 285/165, 166, 302, 331, 11, 53

[56] References Cited

U.S. PATENT DOCUMENTS

| | | | |
|---|---|---|---|
| 264,914 | 9/1882 | Ward | 285/165 |
| 1,284,099 | 5/1918 | Harris | 285/166 |
| 1,922,519 | 8/1933 | Armstrong | 285/302 |
| 2,451,252 | 10/1948 | Stoeckly | 285/166 |
| 2,502,753 | 4/1950 | Rohr | 285/302 |
| 2,616,728 | 11/1952 | Pitt | 285/165 |
| 3,455,582 | 7/1969 | Von Hoeuel | 285/302 |
| 3,652,108 | 3/1972 | Coats | 285/165 |
| 3,864,909 | 2/1975 | Kern | 60/322 |
| 3,908,368 | 9/1975 | Witt | 60/322 |
| 3,997,195 | 12/1976 | Bartholomew | 285/331 |

Primary Examiner—Douglas Hart
Attorney, Agent, or Firm—Richard D. Law

[57] ABSTRACT

A connector for interengaging the exhaust header components of an internal combustion engine that are subjected to movement and vibration to a turbine compressor and/or tail pipe components that are constrained and relatively unmoving wherein inner and outer sleeves of generally telescoping type are separately joined to said moving and constrained components by angular misalignment compensating ball socket joints held in assembled relation with said components by mating flanges. Said inner and outer sleeves further cooperatively provide a close interfitting engagement between a smooth cylindrical surface on one sleeve and a plurality of spaced circumferential ribs on the other sleeve to provide spaced apart pressure sealing zones whereby the pressure of any escaping exhaust gases are reduced by stepped gradients. A pressure collar disposed exteriorly of the interfitted sleeves and in communication with at least one of said zones is itself subjected to superatmospheric pressure to minimize loss of exhaust gases past said seal zones and pressure collar.

3 Claims, 3 Drawing Figures

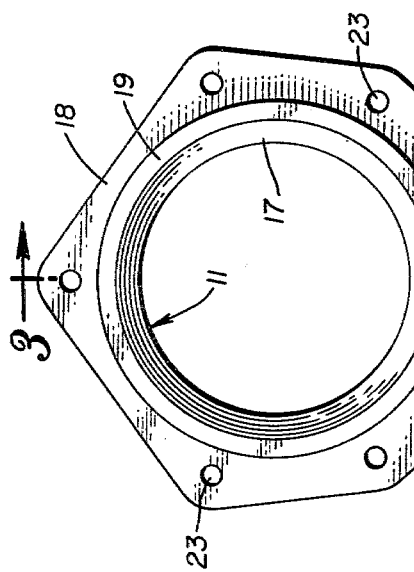
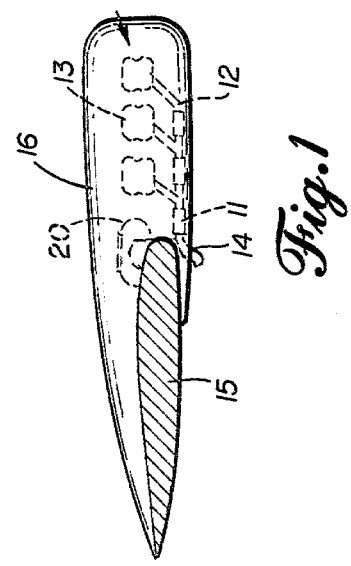
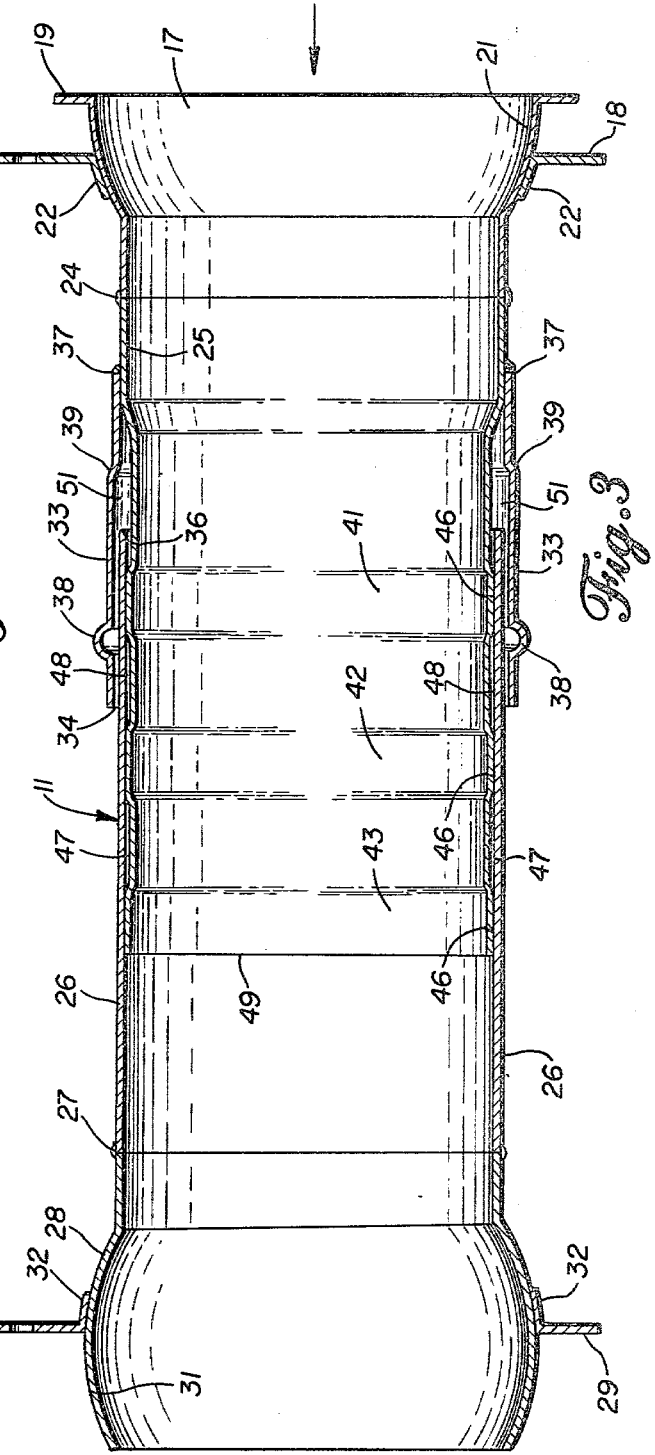

EXHAUST SYSTEM CONNECTOR

BACKGROUND OF THE INVENTION

The inherent torque and vibration characteristics of internal combustion engines make it desirable to provide flexible mounts for such power units. Usually exhaust headers are applied rigidly to the engine for movement therewith, but in many installations the headers must be connected to exhaust tail pipes or other exhaust components that are relatively more constrained than the engine itself. These movement and vibration characteristics present a special problem in connection with the design and fabrication of a connector that will satisfactorily interconnect exhaust header components and other exhaust components for particular installations. When the engine and exhaust system are intended for aircraft use, the problem is even greater. Since the vibration and torque movement patterns for the engine are increased, it is even more desirable that these influences be isolated from the air frame. The high performance characteristics of aircraft engines contribute to a further air safety problem, since a defective connector can burn out in flight to cause a serious fire hazard or to release carbon monoxide gases into the aircraft cabin.

The duty and service requirements for such connectors is increased when exhaust gas turbines are provided for use with aviation engines. In order to minimize precession influences that would act adversely on the rapidly spinning rotor, the turbine is usually mounted on the air frame, and, accordingly, it is relatively restrained when compared with the movement pattern for the engine itself. The engine exhaust gases, at usually higher temperature and pressure, must still be safely and efficiently interconnected to the turbine. Previously used bellows type connectors have a high failure incidence when used for such purpose, and, accordingly, an improved connector is desirable.

SUMMARY OF THE INVENTION

In order to provide an improved connector for engine exhaust systems, the present inventors essentially provide telescoping tube sections that may move reciprocally and rotationally open with respect to the other. To avoid inherent problems of translational and torsional friction where mating cylindrical sections are used and the fretting and galling results thereof and to reduce the characteristic channelization of escaping gases past mating cylindrical surfaces, a modified construction is provided. The potential area of contact between the interfitted and mated cylindrical surfaces is reduced and purposely disposed in a space separated, regulated pattern through provision of a plurality of circumferential ribs on one of the cylindrical sleeves. The limiting surfaces of the circumferential ribs are in close contact with a mating cylindrical surface, but areas of non-contact are preserved between said ribs. Reduction in the total area of contact reduces both translational and torsional friction so that the freedom for relative movement between the sleeves is improved. At the same time it is noted that the leakage characteristics are minimized through use of such arrangement, since the areas of non-contact between the ribs provide circumferential chambers for the collection and retention of exhaust gases that may have passed an upstream rib. In use, the pressure of exhaust gases in each of such successive chambers will be gradually reduced in the downstream direction. This stepped gradient of pressure in the separate chambers tends to minimize the pressure differential across each of the separate ribs, and, accordingly, the escape of gases across the rib to cylindrical surface seal interface is minimized.

When the connector is used with aircraft engine installations at a position disposed within the engine nacelle, it is desirable to provide a pressure collar that will be disposed exteriorally of the interfitted sleeves and over the terminal end of the outer sleeve of such combination. The loosely fitting pressure collar then is disposed to minimize loss of any escaping gases, but it additionally provides a chamber in communication with the last of said pressure seal zones whereby such zone is itself subjected to the superatmospheric pressure influences existent within the engine nacelle. Either or both of the inner or outer sleeves may be provided with ball socket joints and flanges as necessary to join the connector to the exhaust headers of the engine or to any installed turbine compressor or exhaust tail pipe.

BRIEF DESCRIPTION OF THE DRAWINGS

FIG. 1 is a side schematic illustration showing use of the invention in connection with an aircraft installation, FIG. 2 is an end elevation taken from the right end of FIG. 3, and FIG. 3 is a side cross-sectional elevation through the length of the connector showing details thereof.

DESCRIPTION OF THE PREFERRED EMBODIMENTS

A preferred embodiment of the invention is shown in the accompanying Figures, in which FIG. 1 illustrates use of a connector 11 made in accordance with this invention to interconnect the exhaust system 12 of an engine 13 to an exhaust discharge tail pipe 14 beneath the wing 15 of an aircraft, or alternately to an exhaust turbine compressor unit 20 that is disposed in position above the wing but still within the nacelle 16 of the aircraft. In such usage the connector provides a flow passage for the hot exhaust gases of the engine. Moreover the connector 11 operates to isolate the exhaust tail pipe 14 and/or the turbine from the vibration and movement influences acting on the engine and the propeller to which it is connected.

The preferred construction of the exhaust gas connector 11 is shown in FIGS. 2 and 3. In FIG. 2, which is an end view from the socket joint or inlet end of the connector, the inside of the socket joint 17 is seen with seven-hole flange 18 being disposed about the socket joint at a position behind the entrance angle flare 19 on the terminal end of the spherical shaped surface 21 for the socket joint 17. The seven-hole flange 18 has a leg section 22 formed integrally therewith which cooperatively engages the exterior spherical shaped surface 21. In use the flange 18 is connected to a flange of similar shape, size and hole pattern provided by the exhaust system 12 of the aircraft engine. When through bolts are inserted through the holes 23, the interior surface 21 of socket joint 17 is moved into contact with a ball joint (not shown) provided by the exhaust system 12. The flange 18 and the similar flange on the exhaust system will hold the exhaust gas connector 11 securely engaged to the engine exhaust system 12.

Downstream the socket joint component 17 is joined, as by welding, along the line 24 to an inner sleeve 25 which is itself telescopically received within an outer sleeve 26. Outer sleeve 26 is joined by welding along the line 27 to a ball joint end 28 through which the engine exhaust gases pass for conductance to an engine turbo compressor (shown schematically at 20) or alternately to the exhaust discharge tail pipe 14 used by the aircraft. A second flange 29 is disposed about the exterior spherical surface 31 of the ball joint 28. This flange 29, which may be of construction identical with that of the seven-hole flange 18, again has a leg segment 32 that engages the spherically contoured exterior surface of the ball joint end 28. The flange 29 is used in similar manner to connect the connector 11 to the turbine inlet pipes (not shown) or to the exhaust discharge tail pipe 14.

One further component completes the construction for the connector. This component is a pressure collar 33 which is welded to the inner sleeve 25 at a position so that the open free end 34 of the pressure collar 33 will be disposed exteriorally of the outer sleeve 26. In fact, the inner end 36 of the outer sleeve 26 terminates at a position intermediate the free end 34 for the pressure collar 33 and the point of weld attachment 37 for the pressure collar 33 and the inner sleeve 25. With this arrangement the outer sleeve 26, which is of telescoped arrangement with respect to the inner sleeve 25 disposed therein, is itself in a somewhat telescoped arrangement with respect to the pressure collar 33 that surrounds the outer sleeve 26. Since all of such elements must be all closely fitted together in order to provide the low leakage characteristic, it is essential that all of the pieces be of true circular contour. A roll bead 38 is formed in the pressure collar 33 so that the contour and concentricity of this element can be better maintained. In addition to the provision of such roll bead 38, the entire free end of the pressure collar is expanded when compared to the welded end thereof. This arrangement provides a shoulder 39, as shown by the drawings.

In order to provide a combined structure that will have zero or low leakage while still maintaining a telescoping relationship to accommodate vibration and position changes, it is obvious that the inner and outer sleeves 25 and 26 must be closely fitted together. While tubing of sizes that would closely interfit one another in the as-manufactured condition might be obtained, it would be difficult to maintain the close interfit required over a contact length equal to or greater than the diameter of the tubing without running into conditions where the inner and outer tubing pieces would be securely locked or seized together in a manner that would transmit vibration influences to the detriment of the engine exhaust system or the aircraft structure. This is especially true where the fitted tubing pieces are to be subjected to widely varying temperatures.

To avoid the corrosion and fretting conditions that might be encountered with closely interfitted straight walled tubing pieces, the present invention provides a ribbed construction for at least one of the interfitting components. For the embodiment illustrated, a plurality of rib sections 41, 42 and 43 are provided. The rib segments are derived by expanding the material of the inner sleeve 25 at the rib positions 41, 42 and 43 to a size such that the exterior surfaces of the ribs will then closely engage the interior surface 46 of the outer sleeve 26. Sections of the inner sleeve 25 that are disposed intermediate the rib sections 41, 42 and 43 then have their outer surfaces out of contact with the inner surface 46 of the outer sleeve 26, and in effect, chambers, such as the spaced chambers 47 and 48, then exist between the inner sleeve 25 and outer sleeve 26. The described arrangement decreases the total contact area between the inner and outer sleeves and tends to prevent the seizing of such elements one to the other so that telescoping freedom is maintained. It is also found that the tendency of exhaust gases to escape is minimized by this arrangement even when compared to relatively tightly fitting inner and outer straight wall tube sections. Exhaust gases escaping past the terminal end 49 of the inner sleeve 25 that would cross back along the inner surface 46 of the outer sleeve 26 must successively pass each of the raised ribs 43, 42 and 41 before being received in the chamber 51 between the inner sleeve 25 and the pressure collar 33. Flow and passage along such course is not only resisted by the contact between raised rib segments and the outer sleeve, but it is also noted that different pressures exist in the chambers 47 and 48. With the differential pressures across any of the raised segments 41, 42, 43 being reduced, the tendencies for flow thereacross is minimized. Importantly, a low differential pressure across any of the raised segments likewise tends to minimize the channelization of such flow at concentrated zones, and, accordingly, the tendency for the creation of hot spots and for increased burning is also minimized.

Beneficially the interior of the nacelle 16 for aircraft engine installations of the described type is itself subjected to a superatmospheric pressure by reason of ram air due to forward movement of the aircraft or by other pressurizing influences. This raised pressure influence is introduced into the chamber 51 disposed between the pressure collar 33 and inner sleeve 25. Since this pressure is greater than the free air pressure at the exhaust tail pipe 14, any leakage potential is minimized.

In the manufacture of the inner sleeve, it should be noted that the upstream end thereof is of expanded size in order to butt directly with the cylindrical section of the socket joint 17. Accordingly, these similarly sized segments may be butt-welded together at 24. The initial tube stock for the inner sleeve is of an exterior cylindrical size that would easily slip and turn within the outer sleeve 26. The desired friction engagement between the inner sleeve and outer sleeve is obtained by expanding the inner sleeve to provide the rib sections 41, 42 and 43. A multi-segment expanding die is used to provide these rib sections, and it is desirable that the inner sleeve and die be rotated one with respect to the other as the rib sections are expanded so the derived circumferential contact surface 46 will be continuous and smoothly contoured.

The provision of the seven-hole flange makes it possible for this connector unit 11 to be applied to various existing aircraft exhaust systems. The bolt circle diameter for all of the holes 23 is the same, but it should be noted that the actual spacing of the used holes is in equiangular patterns when three bolts or five bolts are used. Accordingly, either of the seven-hole flanges 18 or 29 could be joined to existing three or five bolt flanges that have the same bolt circle diameter.

With usage at widely varied temperatures and under vibration and movement conditions, the further requirement that leakage of exhaust gases be minimized makes it important that the connector utilized be accurately built of materials that have an extended service life. The exhaust gas connector shown in FIGS. 2 and 3 is fabricated of a plurality of parts wherein all of the parts and components are of corrosion and heat resistant materials. Desirably, the components are formed of stainless steel materials that are compatible with their intended uses and also of types that may be efficiently welded together to provide the desired connector assembly. As an example of adequate materials, the tubular components, inclusive of inner and outer sleeves, pressure collar and also the end flanges, may be made of Type T-321 stainless steel. The socket and ball joint connectors at the respective inlet and outlet ends of the connector may be made of Type T-347 stainless steel. Additionally, stainless steel Types 62, 601 and 625 and Inconel may be used as substitute materials.

We claim:

1. In a connector for use on the exhaust system of internal combustion engines to provide a pressure tight seal between components of such systems that are subjected to differential movement patterns including:

telescopically interfitting inner and outer circular sleeves;

means joining the inner of said sleeves to a first upstream component of the exhaust system, means joining the outer of said sleeves to a downstream or outlet component of said exhaust system, whereby gases from said engine are delivered interiorly of said sleeve connector for flow toward the downstream component, the improvement which comprises:

(a) a circular pressure collar having one contracted end interconnected with the inner sleeve and interconnected by a sleeve abutting shoulder with the remainder of a diameter greater than the external diameter of the outer sleeve with the terminal end of the outer sleeve telescoped in the pressure collar through the uncontracted end, and having a roll bead adjacent the uncontracted end providing concentricity thereof, (b) a plurality of longitudinally spaced ribs formed on one of the inner and outer sleeve providing a plurality of circumferential, short cylindrical, axially flat, contact areas with the cylindrical surface of the outer sleeve, which areas are less than the total circumferential axial area between the two telescoped sleeves, providing reciprocal and rotational motion between the two sleeves while maintaining contact therebetween at said contact areas, (c) there being spaced chambers between said ribs for the entrapment of exhaust gases that have passed any upstream rib area providing reduced differential pressures from chamber to chamber.

2. In the assembly of claim 1, the improvement of three spaced ribs, each having a longitudinally flat contacting area for the cylindrical surface of the other sleeve, providing three spaced contact areas.

3. In the assembly of claim 1, the improvement of said ribs formed in the inner sleeve, and said spaced chambers having an axial length of about the axial length of said ribs.

* * * * *